Patented Aug. 11, 1931

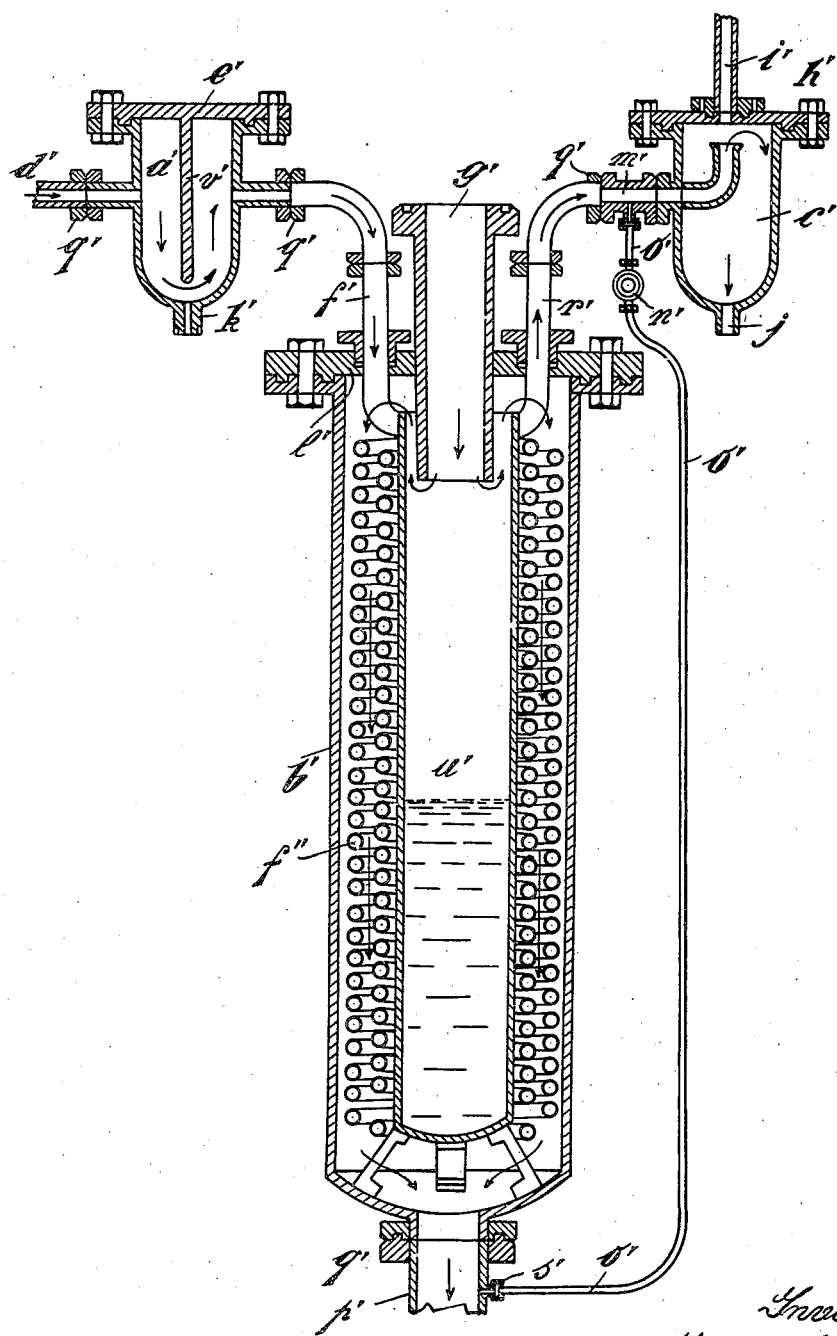

1,818,166

UNITED STATES PATENT OFFICE

JACQUES SCHNEIDER, OF ANTWERP, BELGIUM

REFRIGERATING MACHINE

Application filed February 21, 1930, Serial No. 430,355, and in Belgium April 4, 1929.

The present invention has for its object the construction of a cold economizer for refrigerating apparatus of the compression, condensation and evaporation type, said economizer being mainly intended to liquefy the insufficiently condensed vapours delivered by the condenser without use of supplementary power and to reduce as much as possible the temperature of said vapours, so that they approach the temperature of the brine container or refrigerating chambers.

A great drawback of refrigerators of the above type consists therein that the water used to cool the compressed gases is at a too high temperature, particularly during Summer time and in countries having a hot climate, which water is therefore unable to liquefy completely the compressed vapours.

Various means have already been proposed to obviate this drawback, which greatly reduces the efficiency of refrigerating machines.

My invention remedies these serious defects by providing a simple apparatus, easily applicable to refrigerating systems of the compression type and permitting of greatly increasing the efficiency of the refrigerator, this being done by condensing the insufficiently condensed vapours discharged by the condenser and lowering the temperature of said vapours, so as to bring it as near as possible to the temperature of the brine container or refrigerating chambers.

With this object in view, my said apparatus consists substantially of a closed container, closed at the top and the bottom, inserted in the suction pipe of the compressor and internally provided with a passage or a coil or a number of coils of any convenient shape, through which the insufficiently liquefied gases coming from the condenser travel on their way to the evaporator. Inside said container and round about the passages or coils, the evaporated gases coming from the brine receptacles, refrigerating chambers or the regulating station, are caused to circulate on their way to the compressor.

On passing through this economizer, said evaporated gases are liquefied and the temperature of the obtaining liquid is as near as possible to the temperature of the brine receptacle or refrigerating chambers, and said liquid may then be sent towards the regulating station and be used in the refrigerating installation.

The cold economizer is externally provided with two separating apparatus, one being an oil separator and the other an air separator, a by-pass being, moreover, inserted on the conduit connecting the economizer to the air separator.

The oil separator consists substantially of a cylindrical casing closed at the top and the bottom and inserted on the conduit leading from the condenser to the coil of the economizer. The oil separator is equipped internally with a baffle plate or deflector, against which the gases entering in the separator are projected. The oil that might still be contained in these gases being heavier than same, will be separated therefrom and directed, through a discharge port, into an oil reservoir.

The air separator consists substantially of a cylindrical casing closed at the top and the bottom and inserted in the discharge conduit connected to the coil of the economizer. The air separator is provided internally with an upwardly curved duct forming an extension of the said discharge conduit. The air separator is provided in its upper part with a duct leading to an air reservoir located above the condenser of a refrigerating plant, and in its lower part with a duct leading to the evaporator. Air being lighter than the liquefied vapours, will separate therefrom in the air separator and be discharged into the aforesaid reservoir, whereas the liquefied vapours will follow their course towards the evaporator.

The by-pass consists substantially of a tube, one end of which is inserted on the discharge conduit of the coil of the economizer, between said coil and the air separator, the other end issuing into the main suction channel leading from the economizer to the compressor. The by-pass is also provided with a cock or valve allowing of regulating at will the passage of liquefied gases therethrough. The purpose of the by-pass is to cool, if necessary, the compressor when the latter is superheated.

It is obvious that, in order to avoid any loss of cold, the economizer, oil separator, air separator and by-pass will be constructed with materials which do not conduct heat or cold, said materials also having to withstand the action of ammonia or other chemical agents travelling therethrough, and the various joints will have to be constructed with particular care, so as to be absolutely fluid-tight.

The economizer according to the present invention is, moreover, internally provided with a cylindrical casing, open at the top but closed at the bottom, in which will fall the drops of liquid which the evaporated gas coming from the brine receptacle or refrigerating chambers might still contain and where said liquid will evaporate when the refrigerating apparatus will be restarted. The thus formed vapours will cool the compressor and avoid its superheating.

The invention will be described hereafter with reference to the accompanying drawing.

The drawing shows a longitudinal sectional view of an economizer for a refrigerating machine.

With reference to the drawing, $a'$ indicates the oil separator, $d'$ the conduit coming from the condenser and issuing into the oil separator $a'$ for bringing the insufficiently condensed vapours to the latter, $e'$ being the cover for the oil separator and $k'$ the outlet port for the oil which has been separated therein, said port leading to an oil reservoir not shown on the drawing. The various joints between the economizer, oil separator, air separator, by-pass and the various conduits are indicated by the reference letter $q'$.

The properly so called economizer is shown at $b'$, $g'$ representing the inlet duct through which pass the evaporated gases coming from the brine container or refrigerating chambers, $p'$ representing the outlet conduct through which the evaporated gas passes on its way to the compressor. The insufficiently condensed gases coming from the oil separator pass through the conduit $f'$ into the coil $f''$ fitted inside the economizer, said gases being then liquefied and then escaping thereout through the discharge conduit $r'$. $m'$ illustrates a T-shaped tubular element allowing of branching the by-pass $o'$ on the conduit $r'$, said by-pass $o'$ having a valve or cock $n'$ for regulating purposes.

The air separator is illustrated at $c'$, said separator comprising an outlet duct $i''$, through which the separated air travels towards an air reservoir, not shown on the drawing and located above the condenser. $h'$ illustrates the cover for the air separator and $j'$ the outlet port for the liquefied gases travelling to the evaporator.

The by-pass $o'$ is adapted to allow a desired quantity of liquified gas to pass through it, for the purpose of cooling, in case of need, the compressor, when the latter is superheated. $s'$ indicates the outlet of the by-pass into the discharge conduit $p'$ leading from the economizer to the compressor. The economizer $b'$ is closed by means of a cover $l'$.

The working of the device shown in the drawing is as follows:

The insufficiently condensed gas coming from the condenser enters into the oil separator, through the conduit $d'$, and strikes the deflector or baffle plate $v'$, which separates the oil contained in the gas and directs the oil towards the outlet $k'$ leading to the oil reservoir.

After the oil has been separated, the insufficiently condensed gases pass through the conduit $f'$ into the coil $f''$ of the economizer. Around this coil $f''$ circulates the evaporated gas coming from the brine receptacles or refrigerating chambers and which enters into the chamber $b'$, through the inlet port $g'$ and issues out of said chamber through the outlet port $p'$. Owing to this contact, the insufficiently condensed gas travelling through the coil $f''$ is entirely liquefied and issues out of the economizer through the outlet channel $r'$ and then passes through the tube $n'$ and penetrates into the air separator $c'$. In this separator, any air which might be contained in the liquefied gas is separated, owing to its small specific gravity and is discharged through the duct $i'$ towards the air reservoir located above the condenser. The liquefied gases pass out of the air separator $c'$, through the outlet port $j'$ and travel thence towards the evaporator.

The by-pass $o'$ is intended to allow, in case of need, a certain quantity of liquefied gas to pass directly from the coil $f''$ to the outlet channel $p'$ of the economizer $b'$ and thence to the compressor, so that the latter, should it be superheated, might be cooled by the said liquefied gas. The quantity of liquid passing through the by-pass $o'$ may be adjusted by the valve $p'$.

When the evaporated gas flows out of the conduit $g'$, it penetrates firstly into the inner cylindrical casing $u'$ and then passes into the space surrounding the coil $f''$. During their passage through the reservoir $u'$, the drops of liquid which are usually retained in the gas will fall on the bottom of said reservoir and accumulate thereon. When the refrigerating apparatus is restarted, the thus formed liquid mass will partly or wholly evaporate and cool firstly the coil $f''$ and secondly the compressor.

I claim:

1. In a refrigerating device of the compression type, a cold economizer comprising: a cylindrical casing inserted in the suction pipe of the compressor, a coil arranged inside the casing, one end of the coil being connected with the delivery pipe of the condenser and the other end being connected with the regulating valve of the machine, an inlet and an outlet for the cold vapours flowing from the evaporator to the compressor, the arrangement being such that the heat exchange between the cold vapours flowing around and the insufficiently condensed vapours flowing inside said coil liquefies the latter, and a tank placed inside the casing in such a way that the cold vapours pass through part of it on their way to the space surrounding the coil and allow the drops of liquid which they still retain to fall on the bottom of the tank, whereby the liquid mass accumulating on said bottom will evaporate when the refrigerating device is restarted and thus prevent superheating of the compressor.

2. In a refrigerating device of the compression type, a cold economizer comprising: a cylindrical casing inserted in the suction pipe of the compressor, a coil arranged inside the casing, one end of the coil being connected with the delivery pipe of the condenser and the other end being connected with the regulating valve of the machine, an inlet and an outlet for the cold vapours flowing from the evaporator to the compressor, the arrangement being such that the heat exchange between the cold vapours flowing around and the insufficiently condensed vapours flowing inside said coil liquefies the latter, a tank inside the casing, a by-pass conduit leading from the regulating valve of the machine to the suction pipe of the compressor and a valve in said by-pass.

In testimony whereof I signed hereunto my name.

J. SCHNEIDER.